United States Patent [19]

Call

[11] Patent Number: 5,135,138
[45] Date of Patent: Aug. 4, 1992

[54] METERING CONTAINER

[75] Inventor: Daniel D. Call, Athens, Wis.

[73] Assignee: Jennico, Inc., Eau Claire, Wis.

[21] Appl. No.: 662,421

[22] Filed: Feb. 28, 1991

Related U.S. Application Data

[63] Continuation-in-part of Ser. No. 474,204, Jan. 31, 1990, abandoned, which is a continuation-in-part of Ser. No. 396,993, Aug. 22, 1989, abandoned.

[51] Int. Cl.$^5$ .............................................. G01H 11/26
[52] U.S. Cl. .................................... 222/455; 222/456
[58] Field of Search ................................ 222/454–457

[56] References Cited

U.S. PATENT DOCUMENTS

| | | | |
|---|---|---|---|
| 2,381,800 | 8/1945 | Biskamp | 222/455 |
| 2,425,142 | 8/1947 | Brubaker . | |
| 2,436,140 | 2/1948 | Deardorff | 222/454 |
| 2,834,519 | 5/1958 | Miller | 222/455 |
| 3,235,143 | 2/1966 | Goodrich . | |
| 3,235,144 | 2/1966 | Pitkin et al. . | |
| 3,288,335 | 11/1966 | Steffens et al. | 222/455 |
| 3,738,544 | 6/1973 | Brown . | |
| 4,201,320 | 5/1980 | Eppenbach . | |

FOREIGN PATENT DOCUMENTS

| | | | |
|---|---|---|---|
| 0194407 | 9/1986 | European Pat. Off. . | |
| 2312422 | 5/1975 | France . | |
| 2590555 | 5/1987 | France | 222/456 |

Primary Examiner—H. Grant Skaggs
Attorney, Agent, or Firm—Merchant, Gould, Smith, Edell, Welter & Schmidt

[57] ABSTRACT

A container arrangement is disclosed comprising a container having a plurality of partition walls separating the container into three chambers including a filling chamber, a holding chamber and a source chamber. The holding chamber is connected to a container pouring spout for flowable media to flow from the holding chamber to the spout when the container is oriented in a pour position. The filling chamber has entrance openings and exit openings connecting it to the source chamber and holding chamber, respectively. The filling chamber and its openings are disposed for flowable media to flow from the source chamber to the filling chamber when the container is positioned in the pour position and for flowable media to flow from the filling chamber to the holding chamber when the container is disposed in the rest position. The filling chamber ensures that only a metered amount of flowable media can flow to the holding chamber and be available for pouring through the spout thereby prevent overpourage. In a preferred embodiment, the container arrangement comprises a container with an insert therein. Preferably, the insert is formed from two folded panel structures. In preferred embodiments, air vents are provided to facilitate fluid flow.

21 Claims, 6 Drawing Sheets

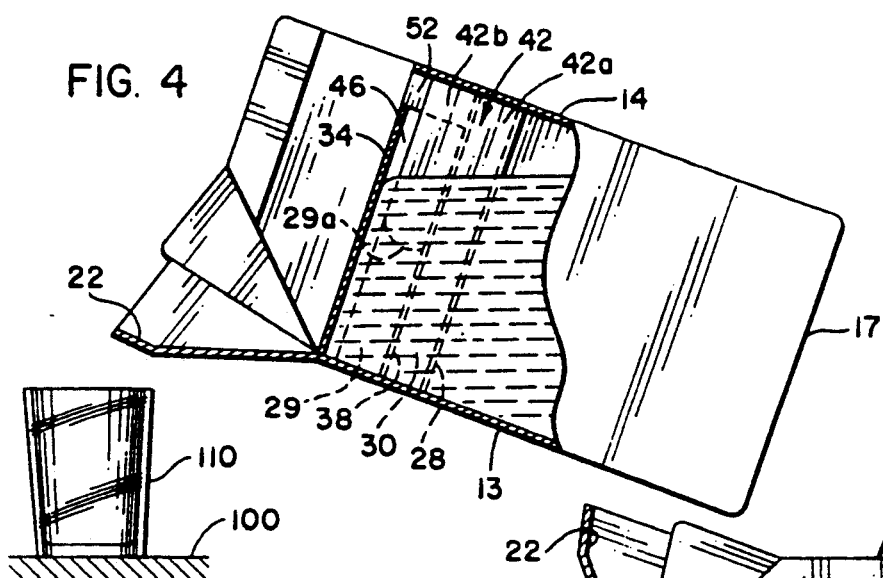
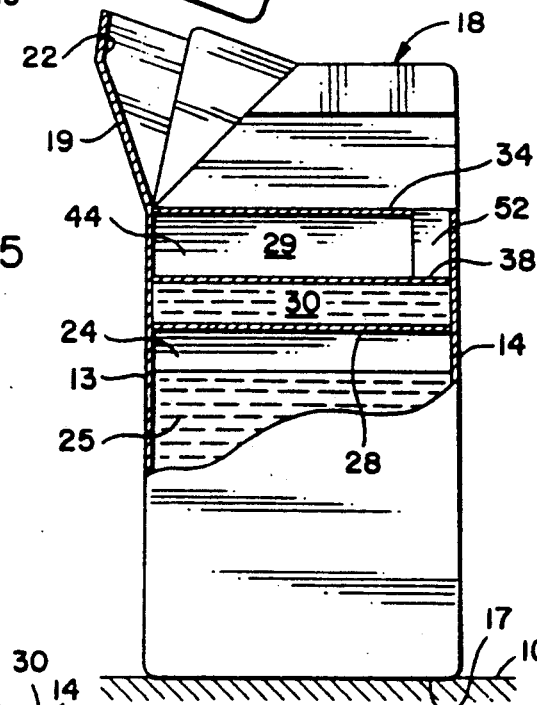
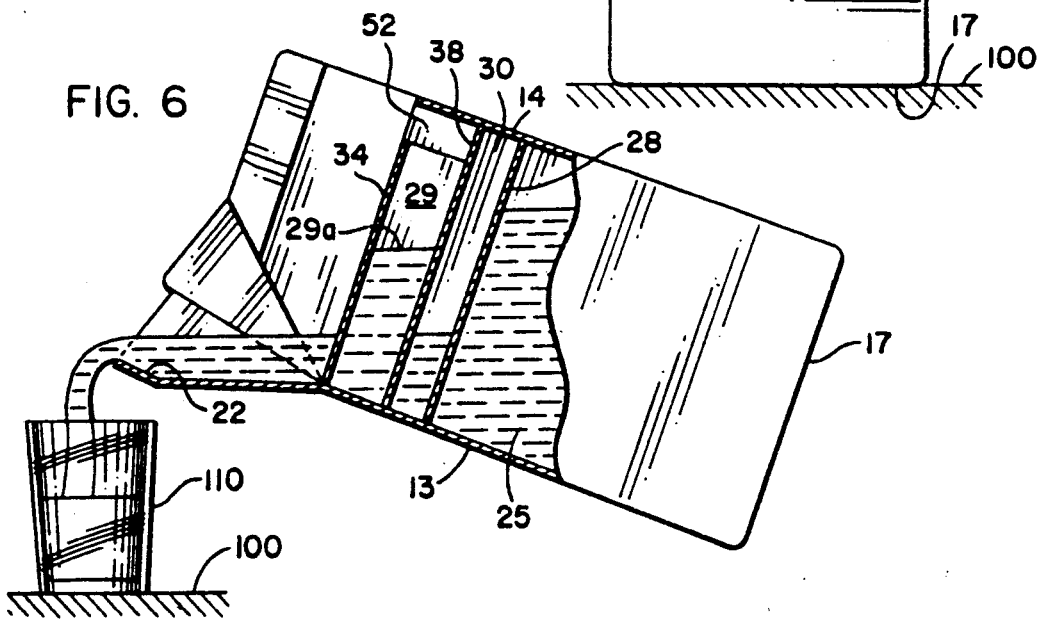

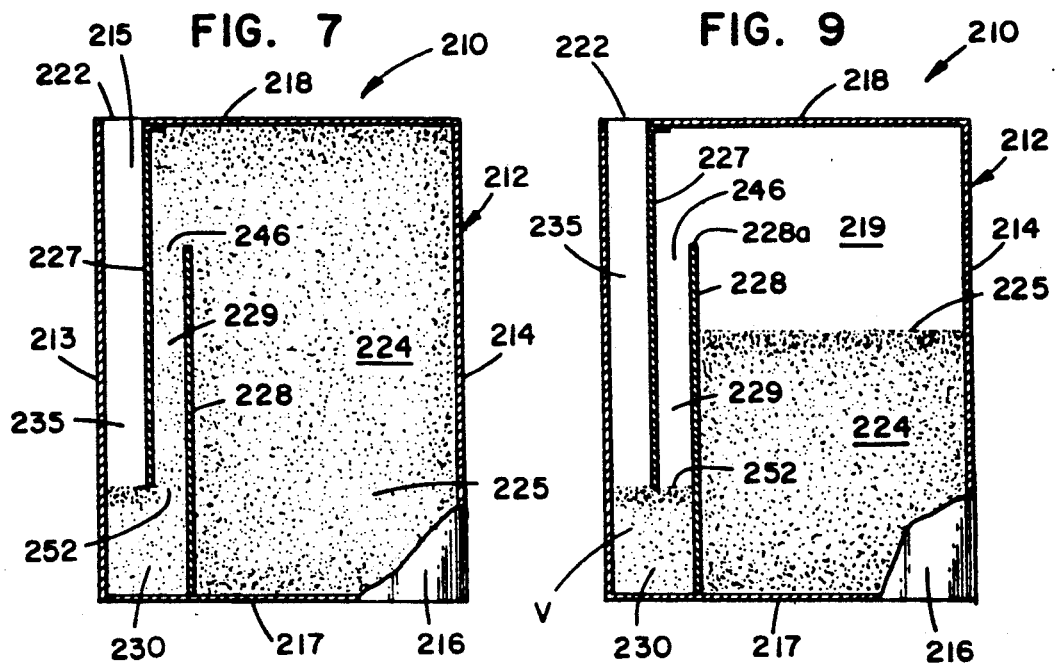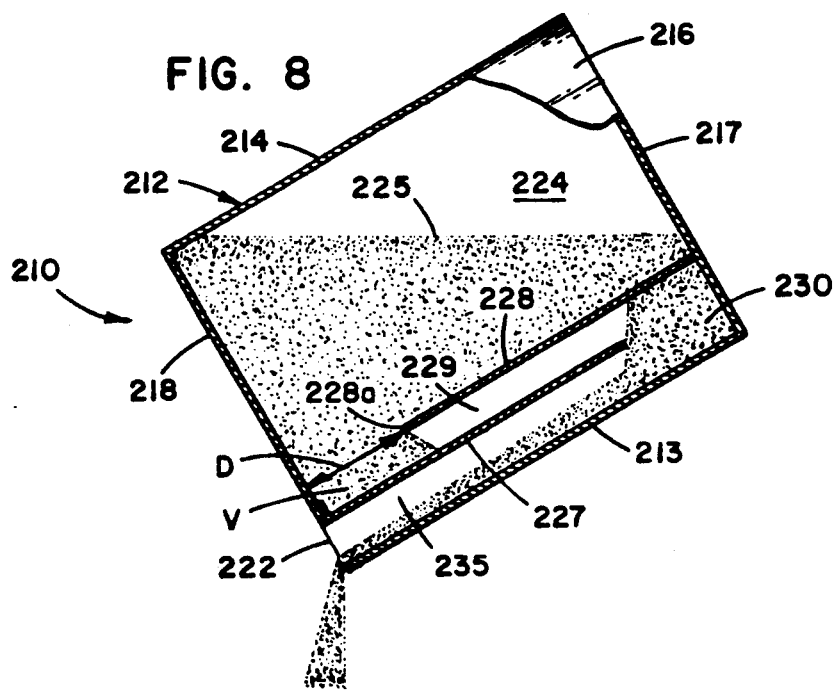

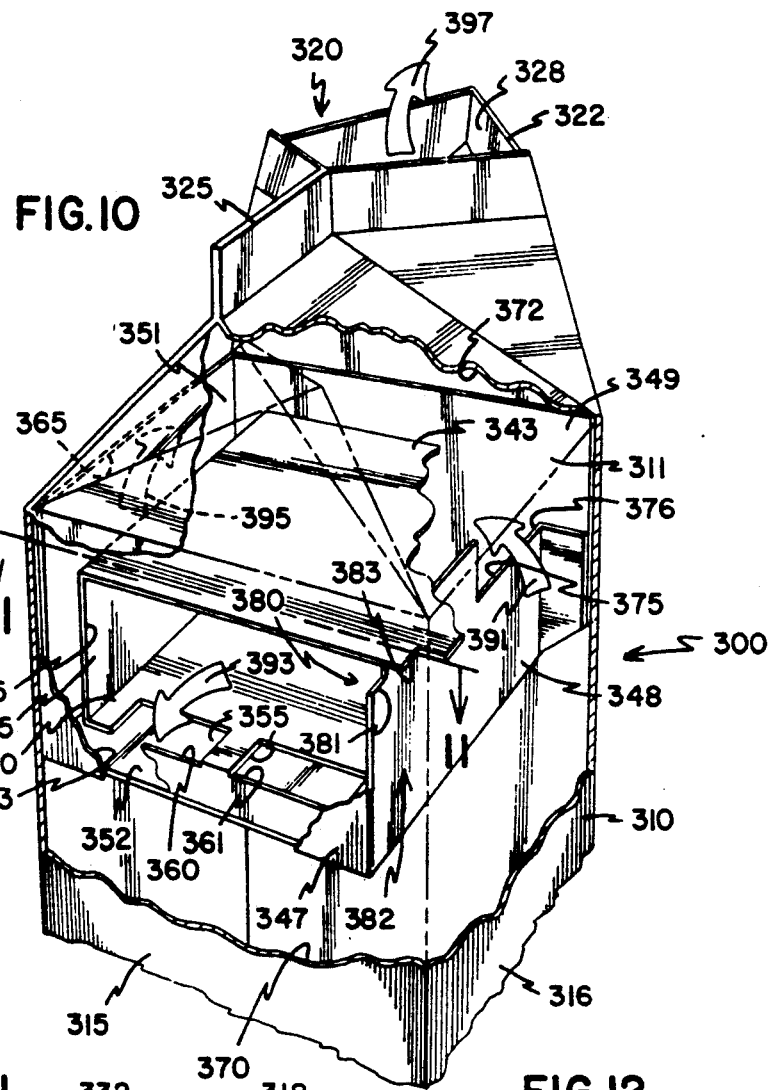
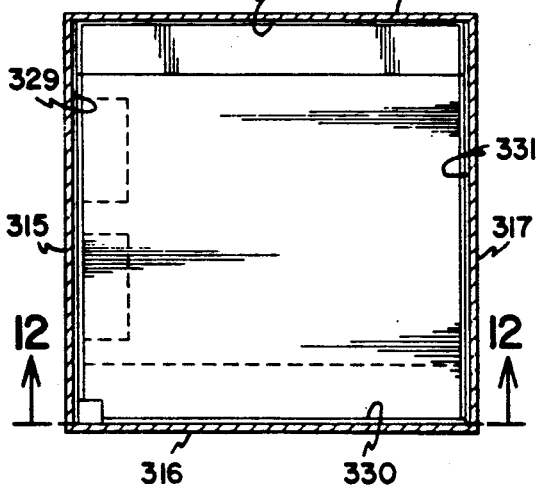
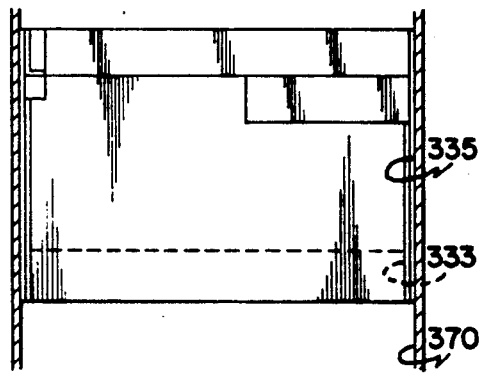

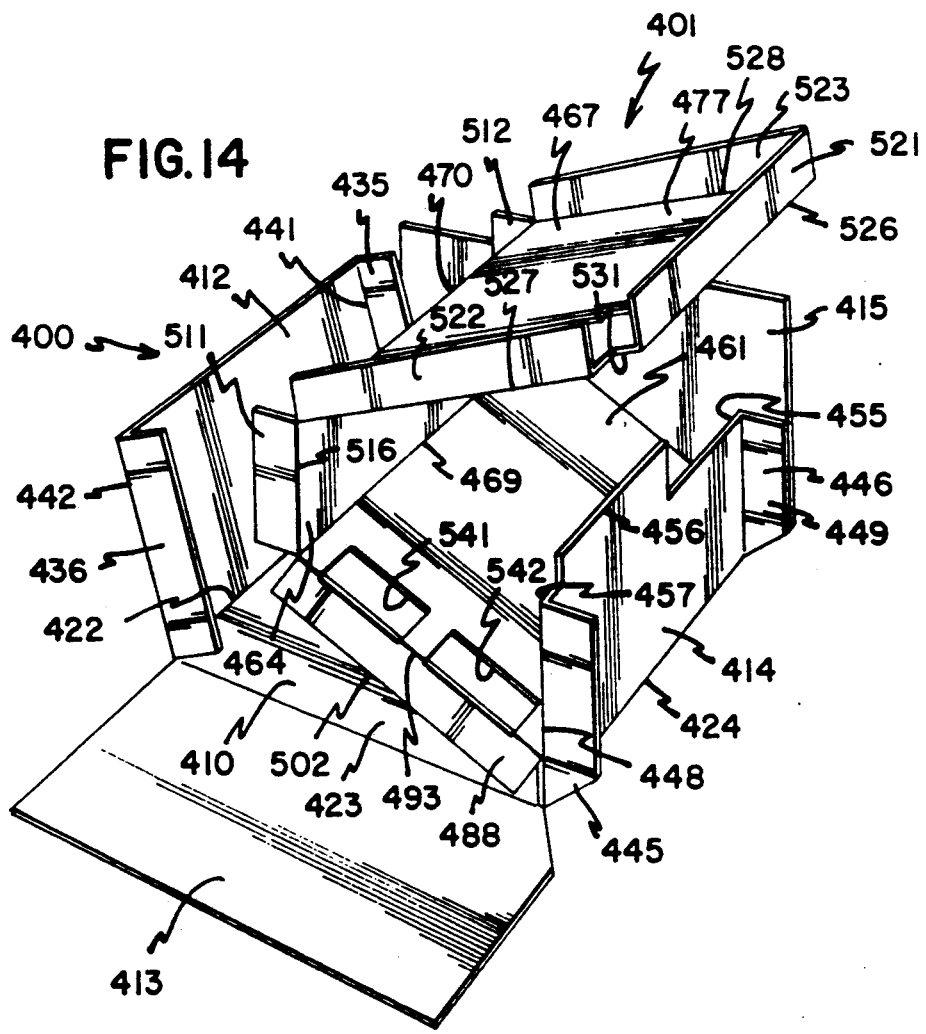

METERING CONTAINER

This is a continuation-in-part of U.S. patent application Ser. No 07/474,204 which was filed Jan. 31, 1990 now abandoned.. Ser. No. 07/474,204 is a file wrapper continuation-in-part of U.S. patent application Ser. No. 07/396,993 which was filed on Aug. 22, 1989, now abandoned..

I. BACKGROUND OF THE INVENTION

1. Field of the Invention

This invention pertains to a container for flowable media such as powders or liquids. More particularly, this invention pertains to media containers having means for controlling a metered amount of liquid flow from the container.

2. Description of the Prior Art

Flowable media containers are available in an enormous selection of sizes and types. Similarly, the enormous selection of containers are used for storing, transporting and pouring an enormous variety of types of flowable media for an enormous variety of uses.

The present invention pertains to containers generally. However, in a preferred embodiment, as will be described, the present invention is intended for principal use in household containers which may include such familiar items as milk cartons, detergent dispensers, bleach dispensers and the like.

A common problem associated with the use of household containers is the overpouring from the container. For example, children attempting to fill a glass with milk from a milk carton may inadvertently overfill the glass thereby pouring milk over a countertop or a table or the like. Similarly, consumers using prior art containers when adding detergent or bleach to a washing machine may inadvertently overpour beyond a desired metered amount of detergent or bleach to be added to a washing machine.

It is the object of the present invention to provide a container which controls the flow of flowable media from the container to be no more than a desired metered amount. It is a further object of the present invention to provide such a flow controlled container which is easily manufactured to permit economical use in consumer products.

II. SUMMARY OF THE INVENTION

According to one embodiment of the present invention, a container is provided having means for defining a plurality of chambers including a main flowable media source chamber, an intermediate filling chamber and a flowable media holding chamber. The container includes a pour spout in gravity flow communication with the holding chamber. Media flows from the holding chamber to the pour spout when the container is oriented in a predetermined pour position. The filling chamber has entrance and exit openings. The entrance opening is in communication with the source chamber. The exit opening is in communication with the holding chamber. The filling chamber and its exit and entrance chambers are so positioned for flowable media to flow from the source chamber into the filling chamber when the container is oriented in the predetermined pour position. In preferred embodiments two air vents, or air vent arrangements, provide airflow communication between the filling chamber and the source chamber and between the source chamber and an upper closure structure of the container. In a storage position, media flows from the filling chamber to the holding chamber.

In another embodiment of the present invention, the filling chamber and the holding chamber comprise an insert which attaches to the inside of a container. Like the embodiment above, the filling chamber of the insert has entrance and exit openings, the entrance opening being in communication with a source chamber in the container. The exit opening of the filling chamber in the insert is in communication with the holding chamber. The holding chamber has a discharge opening which is in communication with a spout of the container. Preferably, the insert has two air vents which improve the flow of liquid through the various chambers prior to discharge.

In a preferred application, the insert is comprised of a receptacle member and a partition member which are mated together to form the filling chamber and the holding chamber. In the most preferred form, the receptacle member is comprised of a foldable five-panel structure which folds into the receptacle member with a base floor and four adjacent walls. In the most preferred form, the partition member is comprised of a three-panel structure which includes a lower panel, a middle panel and an upper panel.

III. BRIEF DESCRIPTION OF THE DRAWINGS

FIG. 4 is a view of the container of FIG. 2 taken along line 4—4 showing the container in a pour position and with a filling chamber being supplied with media from a source chamber;

FIG. 5 is a view of the container similar to the view of FIG. 3 with a holding chamber filled;

FIG. 6 is a view of the container of FIG. 5 in a pour position;

FIG. 7 is a view, shown in section, of an alternative embodiment of the invention showing a container in an upright position and filled;

FIG. 8 is a view, shown in section, of the embodiment of FIG. 7 in a pour position;

FIG. 9 is a view, shown in section, of the embodiment of FIG. 7 in an upright position after a pour;

FIG. 10 is a fragmentary rear perspective with the back portion broken away to show the internal structure with phantom lines to show features out of view.

FIG. 11 is a cross-sectional view of the arrangement shown in FIG. 10 taken along line 11—11 of FIG. 10 with phantom lines showing portions hidden from view.

FIG. 12 is a fragmentary cross-sectional view taken along line 12—12 of the arrangement shown in FIG. 11 with phantom lines showing portions hidden from view.

FIG. 14 is a schematic perspective showing the components of FIG. 13 during assembly.

IV. DETAILED DESCRIPTION OF THE INVENTION

A. A First Embodiment

Referring now to drawing FIGS. 1 through 6 in which identical elements are numbered identically throughout, a description of the preferred embodiment will now be given with reference to a container 10 in accordance with the present invention. Throughout the specification, container 10 will, for convenience, be referred to as a liquid container and the description of the embodiments will be with reference to use with liquids. However, it will be appreciated that the container can be used with other flowable media such as granular material. For the purposes of the description of the preferred embodiment, container 10 will be identified as a container for laundry liquid such as bleach, liquid detergent or the like. However, it will be apparent to those skilled in the art that the container can be utilized for any other liquid such as milk, fruit juices, lubricants, etc. The scope of the present invention is not intended to be limited by the specific embodiment referred to for the purposes of illustration and is intended to contemplate the use of any liquid.

Figure 1:
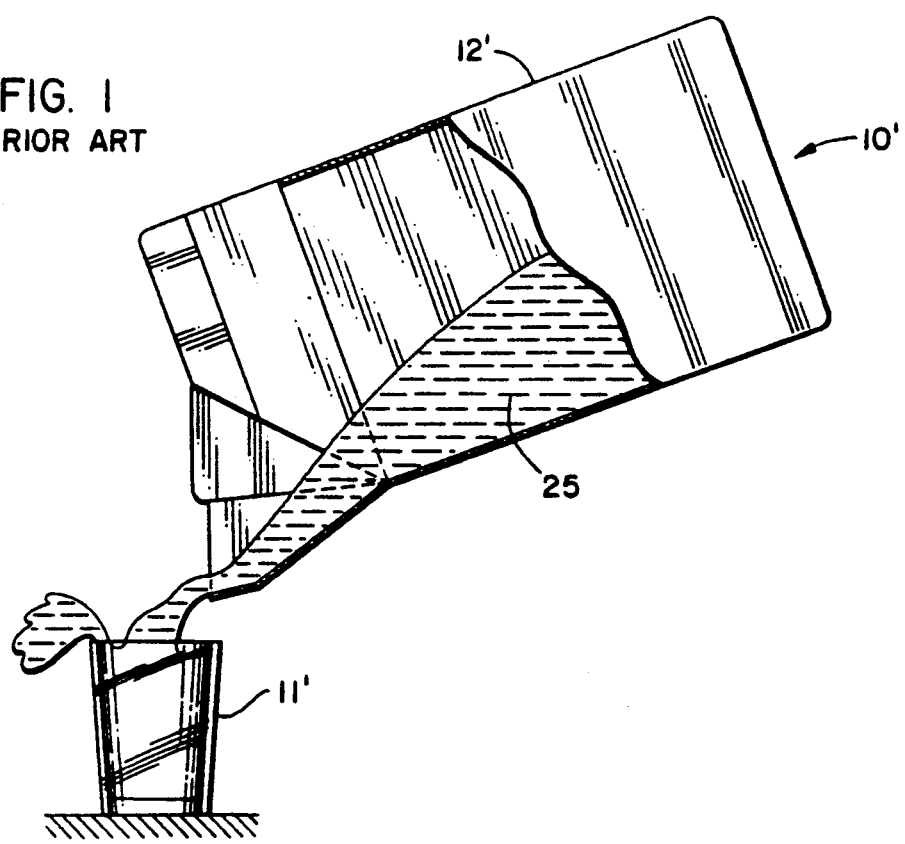
FIG. 1 is a view taken in elevation and partly in section showing a prior art container, such as a milk container, being poured.

To illustrate the problem addressed by the present invention, FIG. 1 shows a prior art container 10' of well-known milk carton construction. The container 10' is shown in a pouring orientation to fill a glass 11'. The container 10' is a hollow shell 12' containing a volume of liquid 25'. If held in the pouring orientation for an extended period of time, liquid pouring from the container 10' will overfill the glass 11', causing spillage.

Figure 2:
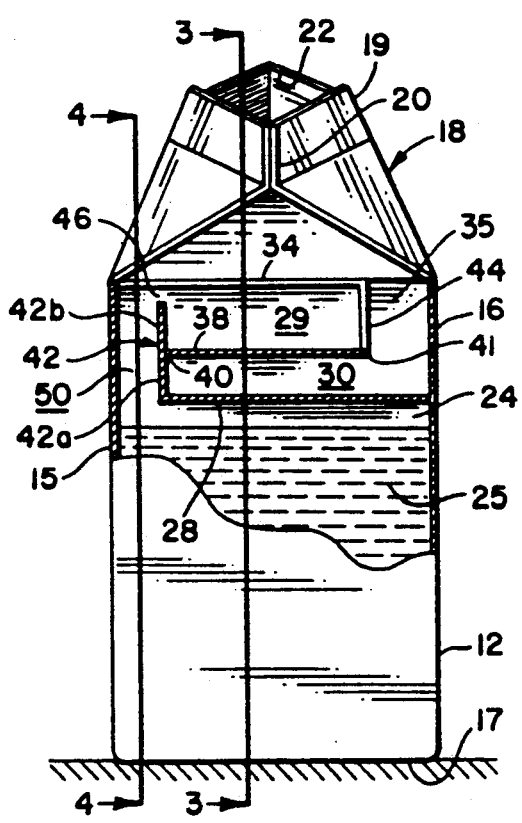
FIG. 2 is a view taken in rear elevation and partially in section showing a container according to the present invention.

According to the present invention, container 10, FIG. 2, is shown in a storage orientation having an exterior shell 12. Shell 12 is shown in the well known configuration of a four-walled milk carton having a front wall 13, a back wall 14, a right (when viewed from front wall 13) side wall 15 and a left side wall 16. Front and back are made with reference to FIG. 3 where "front" is to the left of longitudinal axis X—X and "back" is to the right of the axis.

The side walls are joined by common base 17. Opposite the base 17, an upper closure structure 18 is provided. As in the well-known milk carton construction, closure 18 includes a front fold portion 19 and a back fold portion 20. Front fold portion 19 may be opened (as shown in FIGS. 1-6) to an open configuration defining a pouring spout 22. It will be appreciated that the container having the structure thus far described is well-known in the art. It will also be appreciated that such a construction (namely a milk carton type construction) is not necessary when practicing the present invention. Instead, the present invention could be applicable to any type of container having a pouring orifice such as spout 22. The milk carton type construction is shown for the purposes of a preferred embodiment in that such a structure is readily suitable for manufacturing from biodegradable materials. Such products have enhanced environmental impact over plastic liquid containers. Also, it is an advantage of the present invention that it is particularly well adapted for use with this common type of container.

The shell 12 defines a main liquid source chamber 24. Chamber 24 may contain a volume of liquid 25 applied during manufacturing of the product.

A plurality of partitions or partition walls underneath the closure structure 18 are provided within chamber 24 for defining a filling chamber 29 and a holding chamber 30. The plurality of partition walls includes a lower wall 28 which is parallel to base 17.

Lower wall 28 extends completely the fore and aft length of the main chamber 24 between front and back walls 13 and 14 (as shown in FIG. 5). Also, lower partition wall 28 is connected to front and back walls 13, 14 in liquid-tight sealing engagement. However, lower wall 28 extends only partially through the side-to-side dimension of chamber 24. With reference to FIG. 2, lower wall 28 is shown connected to left side wall 16 in liquid-tight sealing engagement but spaced from right side wall 15.

Figure 3:
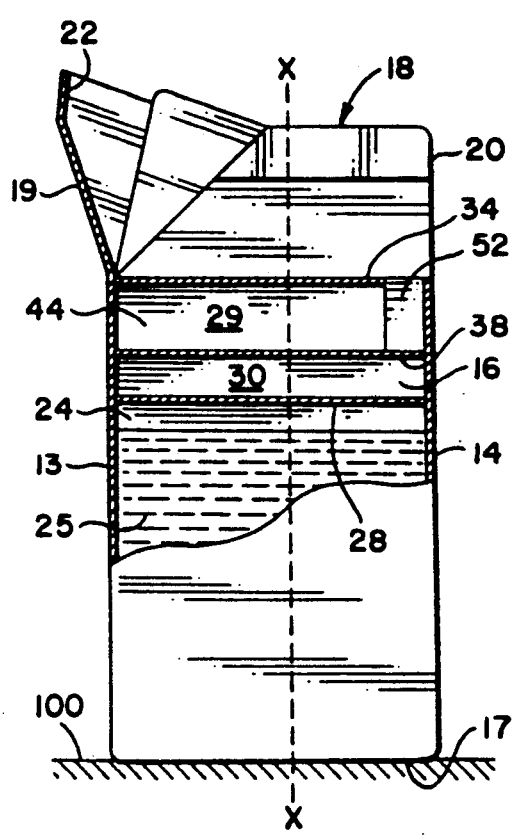
FIG. 3 is a view of the container taken along line 3—3 of FIG. 2, showing flowable media in a source chamber and no media in a holding and filling chamber.

An upper partition wall 34 is provided generally parallel to lower partition wall 28 and base 17 at the point of juncture between shell walls 13, 14, 15 and 16 and closure structure 18. Upper partition wall 34 (as shown in FIG. 3) extends from forward wall 13 toward back wall 14 and is disposed in liquid-tight connection to front wall 13, but is spaced from back wall 14 (see FIG. 3). Like lower partition wall 28, upper partition wall 34 does not extend completely between side walls 15, 16. Unlike lower partition wall 28, upper partition wall 34 is connected to side wall 15 in liquid-tight communication and extends only partially toward side wall 16 to define a gap 35 (as best showed in FIG. 2) which will serve as a discharge opening for a holding chamber which will be described.

Between upper partition wall 34 and lower partition wall 28 is an intermediate partition wall 38. Like wall 28, intermediate partition wall 38 extends completely from forward wall 13 to back wall 14 and is connected to each of forward wall 13 and back wall 14 in liquid-tight communication. Also, like upper partition wall 34 and lower partition wall 28, intermediate partition wall 38 is parallel to base 17.

Unlike walls 28 and 34, intermediate partition wall 38 is not connected to either of side walls 15, 16. Instead, wall 38 terminates at free edges (see FIG. 2).

A first partition plate 42 is provided extending from the free edge of wall 28 and toward upper plate 34. Plate 42 terminates at a free end spaced from upper plate 34 to define a filling chamber entrance opening 46 which extends from front wall 13 to back wall 14 (see FIGS. 2 and 4). Plate 42 is attached to each of walls 28, 38 in liquid-tight connection with a first portion 42a of plate 42 connecting walls 28, 38 and a second portion 42b of plate 42 extending from wall 38 to the free edge spaced from wall 34.

A second partition plate 44 is provided extending between walls 34, 38 opposite plate 42. Plate 44 is connected to walls 34, 38 in liquid-tight connection as shown in FIG. 2. Partition plate 42 extends completely from forward wall 13 to rear wall 14 and are connected to the rear and forward walls 14, 13 in liquid tight communication.

Opposing surfaces of first partition plate 42 and side wall 15 defining a liquid passage 50 which connects filling chamber entrance opening 46 in liquid flow communication with the remainder of the liquid source chamber 24.

Partition plate 44 is connected to front wall 13 in liquid-tight communication but is spaced from back wall 14 to define a filling chamber discharge opening 52 (best shown in FIG. 3). Filling chamber discharge opening 52 connects the filling chamber 29 with the holding chamber 30 in liquid flow communication. Discharge opening 35 connects the holding chamber 30 in liquid flow communication with the pouring spout 22.

Filling chamber 29 is defined by opposing surfaces of upper partition wall 34, intermediate wall 38, second partition plate 44 and second portion 42b of first partition plate 42. The holding chamber 30 is defined by opposing surfaces of lower partition plate 28, intermediate partition wall 38, side walls 16, front and back walls 13, 14, partition plate 44 and the first portion of 42a of partition plate 42.

With the structure thus described, the filling chamber is disposed at least partially (and preferably completely) above the holding chamber whenever the container 10 is in the storage orientation with the filling chamber entrance opening 46 extending the length of the container 10 from front wall 13 to back wall 14.

The filling chamber discharge opening 52 is disposed adjacent the back (i.e. on a side of axis X—X opposite spout 22) of the filling chamber 29 as shown in FIG. 3. The holding chamber discharge opening 35 is disposed on the top of the holding chamber 30 and extends the entire front-to-back length of the holding chamber 30.

With the structure thus described, the container 10 can be used to ensure that only a predetermined metered amount of liquid will be poured from the container at any time. With reference to FIGS. 2 and 3, the container is shown in a predetermined storage orientation with base 17 disposed on a flat horizontal surface 100. In this storage orientation each of the filling chamber 29 and holding chamber 30 is empty and the liquid attains a level within source chamber 24.

FIG. 4 shows the container 10 being tilted to a pour position such that its longitudinal axis X—X is no longer vertical. When tilted to the pouring orientation, no liquid pours from the holding chamber 30 since it is initially empty. However, liquid from the source chamber 24 now progresses up against the upper partition wall 34 which blocks direct flow of the liquid from the source chamber 24 toward the pour spout 22. Instead, the liquid flows through opening 46 into the filling chamber 29 and assumes a level 29a therein. The container 10 is then rotated back to its storage orientation as shown in FIG. 5.

In the process of rotating the container 10 back to the storage orientation, liquid within the filling chamber 29 flows toward the back of the filling chamber 29 and exits through opening 52 and flows downwardly, by influence of gravity, into the holding chamber 30. Now, a metered amount of liquid is within holding chamber 30. When the container 10 is now again rotated to the pouring orientation as shown in FIG. 6, the liquid from the holding chamber 30 flows through opening 35 and out of pouring spout 22.

The bottom partition wall 28 and wall 34 prevent direct gravity flow of liquid from source chamber 24 to spout 22. Instead, these walls 28, 34 direct liquid to flow into the filling chamber 29. When in the pouring orientation, the holding chamber is not being supplied with a fresh flow of liquid since the filling chamber exit port 52 is disposed above the level 29a (see FIG. 6) of liquid within the filling chamber 29.

Accordingly, it is now apparent, with the benefit of the present disclosure, that the holding chamber 30 receives at most a maximum volume of liquid equal to the approximate volume of the filling chamber 29. The construction ensures that prior to the final discharge of liquid from pouring spout 22, all the liquid in the filling chamber 29 will flow into the holding chamber 30 when the container 10 is in the storage orientation (See FIG. 5). Therefore, even if there is not enough liquid in the filling chamber to completely fill the holding chamber 30, advantage is obtained for the final discharge. As a result, a consistent, predetermined amount will be discharged from this embodiment until the last discharge in which substantially all the remaining liquid in the filling chamber 29 flows into the holding chamber 30 and is discharged from pour spout 22 upon final pouring. Thus, the final discharge will be the largest reasonably possible.

By constructing the container 10 in a variety of desired manners, the volume of the filling chamber 29 may be controlled for a predetermined usage. For example, for use in laundry detergent or bleaches, the filling chamber 29 may be sized such that the metered amount of liquid flowing from the pouring spout is an anticipated desired amount for use in a given washing cycle. Another possibility is that in the use in a milk or fruit juice container, the filling chamber may be sized to meter the amount of liquid pouring from the pouring spout 22 to equal an amount sufficient to fill a small glass 110 (for example, about 6 fluid ounces).

B. A Second Embodiment

Referring now to FIGS. 7-9, a second preferred embodiment is shown with reference to a container 210. It is anticipated that container 210 will have particular usefulness with respect to flowable media which are dry material such as powders and the like. The preferred modification of the structure of the invention for use with powders is attributable to the lack of fluidity of the dry material since the material does not seek its own level and permits variation in the construction of the container.

Like container 10, container 210 includes an exterior shell 212 having side walls including front side wall 213 and back side wall 214. The shell 212 will include left and right side walls 215, 216. The shell 212 also includes a common base 217 and a top wall 218. The walls of the shell cooperate to define a shell interior 219.

As shown in the Figures, top wall 218 does not extend completely from back wall 214 to front wall 213. Instead, top wall 218 is spaced from front wall 213 to define a pouring exit port 222.

Shown in FIGS. 7-8, first and second partition walls 227 and 228 are provided within the interior 219 to divide the interior 219 into a plurality of chambers. The plurality of chambers includes a source chamber 224, a filling chamber 229 and a holding chamber 230.

Filling chamber 229 is defined as the volume between the opposing surfaces of the partition walls 227, 228. Holding chamber 230 is the volume defined between the opposing surfaces of the second partition wall 228 and forward wall 213. As shown, the first partition wall 227 extends from top wall 218 and is spaced from bottom wall 217. The holding chamber 230 is disposed beneath the first partition wall 227.

The second partition wall 228 extends upwardly from the base 217 and terminates spaced from the top wall 218. The source chamber 224 is the volume defined between opposing surfaces of the second partition wall 228 and rear wall 214 with the chamber 224 disposed beneath the top edge 228a of the second partition wall.

The filling chamber 229 has an entrance port or entrance opening 246. Opening 246 connects the filling chamber 224 with the source chamber 224 in gravity flow communication when the container 210 is moved from a storage orientation (shown in FIGS. 7 and 9) to a pouring orientation (shown in FIG. 8).

The filling chamber 229 has an exit opening or discharge opening 252. Opening 252 connects the filling chamber 229 in gravity flow communication with the holding chamber 230.

Opposing surfaces of the first partition wall 227 and the forward wall 213 define a discharge conduit 235 which connects the holding chamber 230 in gravity flow communication with the exit port 222 when the container 210 is rotated to the pouring orientation. The exit opening 252 connects the holding chamber 230 with the filling chamber 229 in gravity flow communication when the container is in the storing orientation (FIGS. 7 and 9).

With the structure thus described, the filling chamber 229 acts as a metering device for ensuring that only a metered amount of granular material 225 will be retained in holding chamber 230 and discharged with any pour of the container 210. The amount of granular material which is metered and fed into holding chamber 230 is controlled by the spacing between the partitions 227, 228 and the side walls 215, 216 of the container and the distance D between the top wall 218 and the top edge 228a of second partition wall 228.

Every time the container 210 is tilted to the pouring orientation (FIG. 8) flowable material (such as granular or powder material) retained within the holding chamber 230 flows through the discharge conduit 235 and out of the discharge port. Granular material from the source chamber 224 flows under gravity flow into the area directly above the filling chamber 229. The volume of material so positioned is shown as V in FIG. 8. When the container 210 is tilted back to its storage orientation (FIG. 9), the volume of material V is now retained in the holding chamber 230.

FIG. 7 shows the container when it is completely filled at a manufacturing source. The interior of the container 210 can be completely filled except for the discharge conduit 235. As a result, only a very small volume of the container 210 is empty at the time of manufacture. This results in very little loss of the capacity of the container 210.

C. A Third Embodiment

A third embodiment of the invention is depicted in FIGS. 10-14. While in many manners, the embodiment of FIGS. 10-14 is similar to that shown in FIGS. 1-6, it differs with respect to at least two major features. First, the internal structure responsible for forming the various chambers in the embodiment of FIGS. 10-14 results from an insert positioned in an otherwise open and conventional container. Secondly, the embodiment includes a vent system, to advantage. These features and advantages resulting therefrom will be understood from the following descriptions.

Referring to FIG. 10, an arrangement 300 is shown comprising a container 310 and a insert 311. More specifically, container 310 comprises four side walls, namely back wall 315, left side wall 316 (when viewed toward the front, FIG. 10 being a perspective view from the back), a front wall 317 opposite back wall 315 in FIG. 11, and a right side wall 318 opposite left side wall 316 in FIG. 11 (FIG. 11 being a cross-sectional view of the arrangement shown in FIG. 10 taken along line 11—11 and rotated clockwise approximately 60 degrees). In FIG. 10, the left side wall 316 and the back wall 315 are broken away so that the insert 311 can be viewed. In addition, portions of the insert 311 are broken away, for viewing internal detail.

Container 310 further comprises a foundational base or bottom (not shown in FIGS. 10-14 but analogous to the common base 17 in FIGS. 2-6) attached to the bottom of the four side walls 315, 316, 317, and 318, and a closure structure 320 attached to the top of the four side walls 315, 316, 317, and 318. The closure structure 320 has a front fold portion 322 and a back fold portion 325. Front fold portion 322 has open and closed configurations, and may be opened as shown in FIG. 10 to an open configuration to define a pouring spout 328, in a conventional manner as found, for example, in milk cartons. The container 310 in this configuration has a storage orientation as shown in FIG. 10 and a pouring orientation which results as the container 310 is tipped forward directing internally received fluid toward the closure structure 320 and pouring spout 328.

With the container 310 thus defined, a self-contained insert 311 is positioned completely within, and attached to, inner surfaces 329, 330, 331, and 332 of the four side walls, 315, 316, 317, and 318, respectively in FIG. 11. The insert 311 is also positioned such that it is completely underneath the closure structure 320 of the container 310. The insert 311 can be attached to the inner surfaces 329, 330, 331, and 332 of the four side walls 315, 316, 317, and 318 by a variety of means, for example with a water-insoluble, non-toxic adhesive. Preferably, the interface between the insert 311 and the inner surfaces 329, 330, 331, and 332 is a liquid-tight seal, for reasons which will be apparent from the following discussions.

The insert 311 includes means, such as a plurality of walls, which define a holding chamber 333 and a filling chamber 335. In this embodiment, filling chamber 335 is defined by inferior or intermediate wall 340, superior or upper wall 343, adjoining or inner side wall 345, first adjacent or outer side wall 347, second adjacent or outer side wall 348 and third adjacent or outer side wall 349. Holding chamber 333 is defined by inferior or intermediate wall 340, adjoining or inner side wall 345, first adjacent or outer side wall 347, second adjacent or outer side wall 348, third adjacent or outer side wall 349, fourth adjacent or outer side wall 351, and lower or base wall 352.

FIG. 12 reveals that the filling chamber 335 is positioned at least partially, and preferably substantially completely, above the holding chamber 333 whenever the container 310 is in the storage orientation in FIG. 10. Both the filling chamber 335 and the holding chamber 333 are positioned underneath the closure structure 320 whenever the container 310 is in the storage orientation in FIG. 10.

This arrangement includes a filling chamber discharge opening 355 which can be defined by a variety of means to provide gravity flow communication from the filling chamber 335 to the holding chamber 333. In this context, "gravity flow communication" means the flow of a flowable media from a higher point to a lower point under influence of gravity. In FIG. 10, the filling chamber discharge opening 355 is defined by apertures 360 and 361. As a result, flowable media in the filling chamber 335 will flow under influence of gravity to the holding chamber 333, whenever the container 310 is in the storage orientation, FIG. 12.

This arrangement also includes means which prevents the gravity flow of flowable media from the filling chamber 335 to the holding chamber 333 whenever the container 310 is in a pouring orientation. In FIG. 10., this means is provided by an inferior or intermediate wall 340 contained within the insert 311.

Referring to FIG. 10, the arrangement 300 has means selectively discharging flowable media from the holding chamber 333 whenever the container 310 is in the pouring orientation. For the embodiment of FIGS. 10-14, the means comprises a holding chamber discharge opening 365 (defined by adjoining or inner side wall 345, first adjacent or outer side wall 347, third adjacent or outer side wall 349, and fourth adjacent or outer side wall 351) in cooperation with pouring spout 328.

Once the insert 311 is attached to the inner surfaces 329, 330, 331, and 332 of the four side walls 315, 316, 317, and 318, a source chamber 370, in FIG. 10, is defined underneath the insert by back wall 315, left side wall 316, front wall 317, right side wall 318 and the foundational base of container 310, not viewable but which, again, is analogous to common base 17 in FIGS. 2-6. An upper enclosure chamber 372 is defined above the insert 311 by back wall 315, left side wall 316, front wall 317, right side wall 318 and the closure structure 320 above. The source chamber 370 serves as a reservoir underneath insert 311 and has a general capacity to contain a variety of types of flowable media. The size/volume of the source chamber 370 be changed depending on the positioning of the insert 311 within the container 310. To maximize the amount of flowable media which can be stored in the source chamber 370 of any given container 310, it is preferable to position the insert 311 at the top of the container 310, immediately below the closure structure 320.

With the source chamber 370 thus defined, the arrangement 300 includes means providing gravity flow communication from the source chamber 370 to the filling chamber 335 whenever the container 310 is in the pouring orientation. For the embodiment of FIGS. 10-14, the means for providing this gravity flow communication comprises a functionally positioned filling chamber entrance opening 375 and is defined by an indentation or opening 376 which is cut into second adjacent or outer side wall 348. The arrangement 300 also includes means preventing the flow of a flowable media between the filling chamber 335 and the source chamber 370 whenever the container 310 is in the storage orientation, FIG. 10. For the embodiments of FIGS. 10-14, the means is defined by lower wall or base 352 and second adjacent or outer side wall 348.

The arrangement 300 also includes means preventing the gravity flow of flowable media directly from the source chamber 370 to the holding chamber 333. For the embodiments of FIGS. 10-14, the means is defined by lower or base wall 352 and second adjacent or outer side wall 348. In this context, "directly" means flow between the source chamber 370 and the holding chamber 333 without passage through the filling chamber 335.

The arrangement 300 also has means preventing the direct gravity flow of flowable media from the source chamber 370 to the pouring spout 328. For the embodiments of FIGS. 10-14, the means is defined by lower or base wall 352, second adjacent or outer side wall 348, and superior or upper wall 343. It is facilitated by a fluid tight seal between the insert 311 and the container 310. In this context "direct" means flow from the source chamber 370 to the pouring spout 328 without passage through the holding chamber 333 and filling chamber 335.

Referring to FIG. 12, the arrangement 300, as defined above, results in the filling chamber 335 being at least partially, and preferably substantially completely, above the source chamber 370. The arrangement 300 also results in the holding chamber 333 being at least partially, and preferably substantially completely, above the source chamber 370.

The arrangement 300 contains first and second air vents which inhibit the formation of vacuums from undesirably developing during the discharge from, or fluid flow within, arrangement 300. The first air vent 380 is defined by an indentation or opening 381 which is cut into second adjacent or outer wall 348. This air vent 380 is positioned above filling chamber entrance opening 375 whenever the container 310 is in the pouring orientation and provides airflow communication between the filling chamber 335 and the source chamber 370. The second air vent 382 is defined by an indentation or opening 383 which is cut into superior or upper wall 343. This second air vent 382 is also positioned above the filling chamber entrance opening 375 whenever the container 310 is in the pouring orientation and provides airflow communication between upper enclosure chamber 372 and the source chamber 370. In this context, "airflow communication" means uninhibited flow of air between two points, to allow pressure equalization and thus smooth fluid flow.

With the arrangement 300 thus defined above, the arrangement 300 operates in a similar, but not necessarily identical, manner as the arrangement disclosed in the first embodiment. As the container 310 is tipped to a pouring orientation, flowable media travels toward the pouring spout 328. The flowable media, however, is blocked from reaching the pouring spout 328 by lower or base wall 352, second adjacent or outer side wall 348, and superior or upper wall 343. Instead, flowable media enters through the filling chamber entrance opening 375 and into filling chamber 335. In FIG. 10, arrow 391 indicates the flow of flowable media entering the filling chamber 335 when the container 310 is in the pouring orientation. As a result, a metered amount of flowable media is contained in the filling chamber 335.

During the flow of the flowable media through filling chamber entrance opening 375, first air vent 380 and second air vent 382 provide air to the filling chamber 335 and the source chamber 370. As a result, the flowable media flows into the filling chamber 335 without vacuum formation. Thus, fluid flow is smoother.

When the container 310 is tipped back to the storage orientation, FIG. 10, the metered amount of flowable media flows through filling chamber discharge opening 355 into the holding chamber 333. In FIG. 10, arrow 393 indicates the flow of flowable media entering the holding chamber 333 when the container 310 is returned to a storage orientation. As the container 310 is tipped again to a pouring orientation, the metered amount of flowable media flows through holding chamber discharge opening 365 and out the pouring spout 328. In FIG. 10, phantom arrow 395 indicates the flow of flowable media exiting the holding chamber 333 through the holding chamber discharge opening 365 to the pouring spout 328 when the container 310 is again placed in the pouring orientation. Arrow 397 indicates the flow of flowable media exiting the pouring spout 328 while the container 310 remains in the pouring orientation.

Insert 311 can be formed from a single-molded structure or be assembled from a plurality of structures. In the preferred embodiment shown, insert 311 is formed from a receptacle member 400 having a partition member 401 nested therein, FIG. 14. While the receptacle member 400 and partition member 401 may be formed in a variety of manners, including molding, it is a particular advantage to certain embodiments of the present invention that they may be folded from foldable panel structures. Referring to FIG. 10, receptacle 400 comprises a lower or base wall 352, first adjacent or outer side wall 347, second adjacent or outer side wall 348, third adjacent or outer side wall 349, and fourth adjacent or outer side wall 351; and, partition member 401 comprises inferior or intermediate wall 340, adjoining or inner side wall 345, and superior or upper wall 343.

Figure 13:
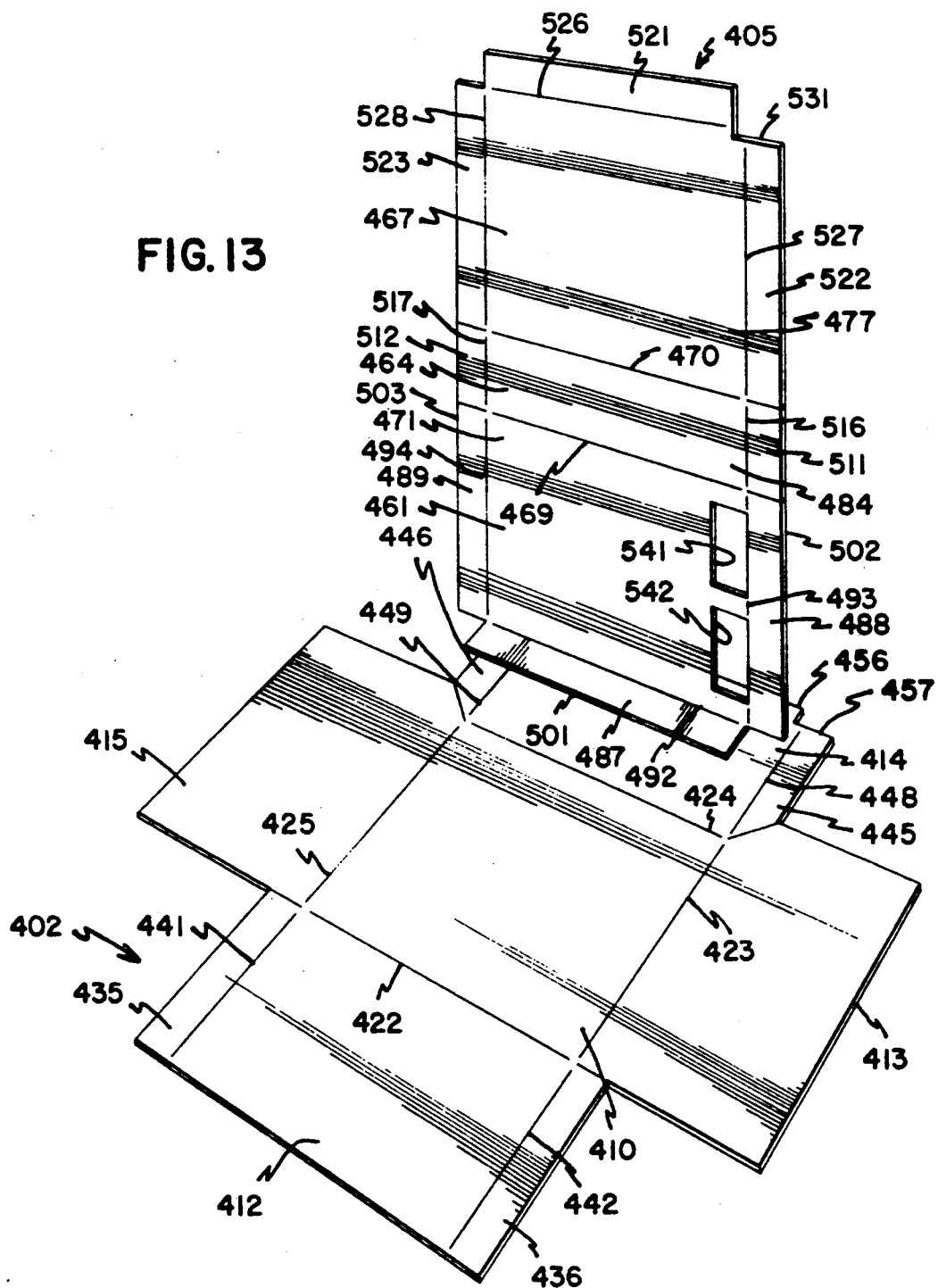
FIG. 13 is a schematic perspective of components which fold and assemble into a portion of the arrangement shown in FIG. 10.

Referring to FIGS. 13 and 14, insert 311 is comprised of a foldable five-panel structure 402 and a foldable three-panel structure 405. Five-panel structure 402, in FIG. 13, has a center panel 410 which corresponds to lower or base wall 352 in FIG. 10, and four attached adjacent panels, first panel 412, second panel 413, third panel 414 and fourth panel 415 which correspond to fourth adjacent or outer side wall 351, first adjacent or outer side wall 347, second adjacent or outer side wall 348, and third adjacent or outer side wall 349 in FIG. 10, respectively. In FIG. 13, first panel 412 is opposite third panel 414 with respect to center panel 410; and second panel 413 is opposite fourth panel 415 with respect to center panel 410.

The four side panels, 412, 413, 414, and 415 are folded upwardly, FIG. 14, along fold lines 422, 423, 424, and 425, respectively to form receptacle member 400, FIG. 14, FIG. 14 being a schematic perspective rotated approximately 90 degrees clockwise with respect to the schematic perspective of FIG. 13.

In FIG. 14, third panel 414 and fourth panel 415 are shown folded up, panel 412 is shown partly folded up, and second panel 413 has not yet been folded. Attached to first panel 412 in FIG. 13 are first tab 435, which is adjacent but not attached to fourth panel 415, and second tab 436, which is adjacent but not attached to second panel 413. First tab 435 and second tab 436 are opposite each other with respect to first panel 412 in FIG. 13. First tab 435 and second tab 436 are folded inward towards center panel 410 along fold lines 441 and 442, respectively in FIG. 14. First tab 435 is affixed to fourth panel 415 to form a liquid-tight corner seal between first panel 412 and fourth panel 415 in FIG. 14. Second tab 436 is affixed to second panel 413 forming a liquid-tight corner seal between first panel 412 and second panel 413.

Attached to third panel 414 in FIG. 13 are third tab 445, which is adjacent but not attached to second panel 413, and fourth tab 446, which is adjacent but not attached to fourth panel 415. Third tab 445 and fourth tab 446 are opposite each other with respect to third panel 414 in FIG. 13. Third tab 445 and fourth tab 446 are folded outward from center panel 410 along fold lines 448 and 449, respectively in FIG. 14. Third tab 445 is affixed to second panel 413 forming a liquid-tight corner seal between second panel 413 and third panel 414 in FIG. 14. Fourth tab 446 is affixed to fourth panel 415 forming a liquid-tight corner seal between third panel 414 and fourth panel 415. As a result, a four-sided receptacle member 400 with a center panel 410 as a base is formed.

Referring to FIG. 14, receptacle member 400 has a first indentation 455 which is cut into third panel 414 along its outer edge 456 such that indentation 455 is adjacent to fourth panel 415. First indentation 455 corresponds to indentation 376 in FIG. 10. Receptacle member 400 in FIG. 14 also has a second indentation 457 which is cut into third panel 414 along its outer edge 456 such that indentation 457 is adjacent second panel 413. Second indentation 457 corresponds to indentation 381 in FIG. 10.

Three-panel structure 405, in FIG. 13, has a lower panel 461 which corresponds to inferior or intermediate wall 340 in FIG. 10, a middle panel 464 which corresponds to adjoining or inner side wall 345 in FIG. 10, and an upper panel 467 which corresponds to superior or upper wall 343 in FIG. 10. Lower panel 461 is opposite upper panel 467 with respect to middle panel 464. Lower panel 461 and upper panel 467 are folded along fold lines 469 and 470, respectively in FIG. 14, so as to be substantially perpendicular to middle panel 464 and substantially parallel to each other such that the surface 471 of lower panel 461 faces away from the surface 477 of upper panel 467, FIG. 14. As a result, a partition member 401 is formed.

The partition member 401 is nested or placed within the receptacle member 400 such that: lower panel 461 is substantially parallel to and above center panel 410 such that surface 471 faces center panel 410; middle panel 464 is substantially parallel to the first panel 412 such that a surface 484, FIG. 13, of middle panel 464 faces the first panel 412; and, the upper panel 467 is substantially parallel to and above both lower panel 461 and center panel 410 such that surface 477 faces away from both lower panel 461 and center panel 410.

Fifth tab 487 is attached to lower panel 461 in FIG. 13 and is positioned opposite middle panel 464 with respect to lower panel 461. Lower panel 461 has attached sixth tab 488 and seventh tab 489 which are positioned opposite each other with respect to lower panel 461, FIG. 13. When partition member 401 is placed within receptacle member 400 in FIG. 14, tabs 487, 488, and 489, are folded toward and substantially perpendicular to center panel 410 along fold lines 492, 493 and 494, respectively.

Fifth tab 487 is affixed to third panel 414 creating a liquid-tight corner seal between lower panel 461 and third panel 414, FIG. 14. Fifth tab 487 is positioned along third panel 414 so that the tip 501, FIG. 13, of fifth tab 487 rests upon center panel 410. This results in a liquid-tight corner seal between lower panel 461 and third panel 414. Sixth tab 488 is positioned along second panel 413 so that the tip 502, FIG. 13, of sixth tab 488 rests upon center panel 410, FIG. 14. This results in a liquid-tight corner seal between lower panel 461 and second panel 413. Seventh tab 489 is positioned along fourth panel 415 so that the tip 503, FIG. 13, of seventh tab 489 rests upon center panel 410. This results in a liquid-tight corner seal between lower panel 461 and fourth panel 415. As a result, lower panel 461 is firmly elevated above center panel 410 by tabs 487, 488, and 489.

Middle panel 464, in FIG. 13, has eighth tab 511 and ninth tab 512 which are opposite each other with respect to middle panel 464 and are adjacent, but unattached, to sixth tab 488 and seventh tab 489, respectively. Eighth tab 511 and ninth tab 512 are folded toward the first panel 412 along fold lines 516 and 517, respectively in FIG. 14. Eighth tab 511 is affixed to second tab 436 resulting in a liquid-tight corner seal between middle panel 464 and second panel 413. Ninth tab 512 is affixed to first tab 435 resulting in a liquid-tight corner seal between middle panel 464 and fourth panel 415.

Tenth tab 521 is attached to upper panel 467 in FIG. 13 and is positioned opposite middle panel 464 with respect to upper panel 467. Attached to upper panel 467 are eleventh tab 522 and twelfth tab 523 which are positioned opposite each other with respect to upper panel 467 and are adjacent, but unattached, to eighth tab 511 and ninth tab 512, respectively. When partition member 401 is placed within receptacle member 400 in FIG. 14, tabs 521, 522, and 523 are folded away from and substantially perpendicular to center panel 410 along fold lines 526, 527 and 528, respectively in FIG. 14. Eleventh tab 522 is affixed to second panel 413 resulting in a liquid-tight corner seal between upper panel 467 and second panel 413. Twelfth tab 523 is affixed to fourth panel 415 resulting in a liquid-tight seal between upper panel 467 and fourth panel 415. Upper panel 467 extends beyond the third panel 414 and is affixed to panel 414 with a liquid-tight seal along outer edge 456. Tenth tab 521 is affixed with a liquid-tight seal directly to container 310 in FIG. 10.

In FIG. 13, a third indentation 531 is cut into upper panel 467 and is positioned adjacent to both tenth tab 521 and eleventh tab 522. Indentation 531 corresponds to second air vent 382 in FIG. 10. A first aperture 541, in FIGS. 13 and 14, is located within lower panel 461 and positioned adjacent to middle panel 464 and sixth tab 488. The first aperture 541 corresponds to aperture 360 in FIG. 10. A second aperture 542, in FIGS. 13 and 14, is located within lower panel 461 and positioned adjacent to fifth tab 487 and sixth tab 488. Second aperture 542 corresponds to 361 in FIG. 10.

As a result of the above folding and affixations, an insert 311 is achieved with its various chambers and apertures. In use, the insert 311 may be appropriately mounted within a container 310 to achieve an arrangement 300 according to the present invention.

A variety of materials may be used to form foldable panel structures 402 and 405. Preferably they are made from treated paperboards, cardboard, or the like; i.e., from materials similar to those from which cardboard milk cartons are formed. Preferably, the panel structures 402 and 405 are provided with protective coatings on at least the sides thereof which will come into contact with fluid stored within the container 310.

From the foregoing detailed description of various embodiments of the present invention, it has been shown how the objects of the invention have been attained in preferred manners. However, modifications and equivalence of the disclosed concepts, such as those which may readily occur to one skilled in the art, are intended to be included within the scope of the present invention. Accordingly, scope of the present invention shall be limited only by the scope of the claims.

What is claimed is:

1. An arrangement comprising:
   a. a four-walled container having a storage orientation and a pouring orientation; said container including an upper closure structure foldable between open and closed configurations; said closure structure when folded into said open configuration defining a pouring spout in said container;
   b. means defining a holding chamber and a filling chamber in said container; said holding chamber and said filling chamber being contained completely within said container and completely underneath said closure structure whenever said container is in the storage orientation; said filling chamber being disposed completely above said holding chamber whenever said container is in the storage orientation;
   c. means providing gravity flow communication from said filling chamber to said holding chamber whenever said container is in the storage orientation;
   d. means preventing gravity flow of flowable media between said holding chamber and said filling chamber whenever said container is in the pouring orientation; and
   e. means selectively discharging flowable media only from said holding chamber and said container whenever said container is in the pouring orientation.

2. An arrangement according to claim 1 wherein said filling chamber is disposed substantially directly above said holding chamber whenever said container is in the storage orientation.

3. An arrangement according to claim 1, in combination with a flowable media positioned within said container which flows into said filling chamber whenever said container is in the pouring orientation.

4. An arrangement as in claim 1 further comprising:
   a. means defining a source chamber;
   b. means providing gravity flow communication from said source chamber to said filling chamber whenever said container is in the pouring orientation;
   c. means preventing gravity flow of flowable media between said filling chamber and said source chamber whenever said container is in the storage orientation;
   d. means preventing gravity flow of flowable media directly from said source chamber to said holding chamber whenever said container is in the pouring orientation; and
   e. means preventing flow of flowable media directly from said source chamber to said spout whenever said container is in the pouring orientation.

5. An arrangement according to claim 4, wherein at least a portion of said source chamber is disposed underneath said filling chamber.

6. An arrangement according to claim 4, wherein at least a portion of said source chamber is disposed underneath said holding chamber.

7. An arrangement according to claim 4 further comprising:
   a. a first air vent disposed above said means providing gravity flow communication from said source chamber to said filling chamber whenever said container is in the pouring orientation; said first air vent providing airflow communication between said filling chamber and said source chamber; and
   b. a second air vent disposed above said means providing gravity flow communication from said source chamber to said filling chamber whenever said container is in the pouring orientation; said second air vent providing airflow communication between the upper closure and said holding chamber to said source chamber.

8. An arrangement according to claim 1 wherein:
   a. said means defining said holding and said filling chamber includes a plurality of partition walls disposed completely within said container; said plurality of partition walls being disposed completely underneath the closure structure whenever said container is in the storage orientation; said plurality of partition walls defining said holding chamber between said source chamber and said filling chamber;

(i) said plurality of partition walls including means defining an entrance opening between said source chamber and said filling chamber, said entrance opening permitting gravity flow communication from said source chamber to said filling chamber whenever said container is in the pouring orientation;

(ii) said plurality of partition walls further including means defining a filling chamber exit opening between said filling chamber and said holding chamber, said exit opening permitting gravity flow communication from said filling chamber to said holding chamber whenever said container is in the storage orientation; and (iii) said plurality of partition walls further including means defining a discharge opening between said holding chamber and said spout, said discharge opening permitting gravity flow communication from said holding chamber to said pouring spout whenever said container is in the pouring orientation.

9. An arrangement according to claim 8 wherein said container has a central vertical axis whenever said container is in the storage position, said spout being disposed on a side of the axis and said filling chamber exit opening being disposed on a side of the axis opposite said spout.

10. An arrangement according to claim 9 wherein said means defining a filling chamber entrance opening is disposed on the same side of the axis as said spout.

11. An arrangement according to claim 1 wherein said means defining a holding chamber and a filling chamber comprises an insert positioned completely within and affixed to said container, said insert being positioned completely underneath said closure structure whenever said container is in the storage orientation.

12. An arrangement according to claim 11, wherein:
a. said container defines a source chamber; and
b. said insert includes:
 i. means providing gravity flow communication from said source chamber to said filling chamber whenever said container is in the pouring orientation;
 ii. means preventing gravity flow of flowable media between said filling chamber and said source chamber whenever said container is in the storage orientation;
 iii. means preventing gravity flow of flowable media directly from said source chamber to said holding chamber whenever said container is in the pouring orientation; and
 iv. means preventing gravity flow of flowable media directly from said source chamber to said spout whenever said container is in the pouring orientation.

13. An arrangement according to claim 12, wherein said filling chamber is disposed substantially directly above the source chamber of said container whenever said container is in the storage orientation.

14. An arrangement according to claim 12, wherein said holding chamber is disposed substantially directly above the source chamber of said container whenever said container is in the storage orientation.

15. An arrangement according to claim 12 further comprising:
a. a first air vent disposed above said means providing gravity flow communication from said source chamber to said filling chamber whenever said container is in the pouring orientation; said air vent providing airflow communication between said filling chamber and said source chamber; and
b. a second air vent disposed above said means providing gravity flow communication from said source chamber to said filling chamber whenever said container is in the pouring orientation, said second air vent providing airflow communication between the upper enclosure and said filling chamber to said source chamber.

16. An arrangement according to claim 11 wherein said insert comprises a receptacle member and a partition member:
a. said receptacle member comprising a base wall and four adjacent side walls; and
b. said partition member comprising an inferior and superior wall attached together by an adjoining wall to said inferior and said superior wall; wherein said partition member is received within said receptacle member to form said filling chamber and said holding chamber.

17. An arrangement according to claim 16 wherein said receptacle member is comprised of a folded, five-panel structure having:
a. a center panel which forms said base wall of said receptacle; and
b. four adjacent panels which fold together and form said adjacent side walls of said receptacle member.

18. An arrangement according to claim 16 wherein said partition member is comprised of a folded three-panel structure having:
a. a lower panel which forms said inferior wall of said partition member;
b. a middle panel attached to said lower panel which forms said adjoining wall of said partition member; and
c. a upper panel attached to middle second panel which forms said superior wall of said partition member.

19. An insert, for positioning within a container having a spout, a source chamber and having pouring and storing orientations; said insert providing for formation of an arrangement for selectively discharging metered amounts of flowable media, said insert comprising:
a. means defining a holding chamber and a filling chamber;
b. means providing gravity flow communication from the source chamber to said filling chamber whenever the insert is operably positioned within a container, and the container is positioned in the pouring orientation; said filling chamber being disposed completely above said holding chamber whenever the container is in the storage orientation;
c. means providing gravity flow communication from said filling chamber to said holding chamber whenever the container is in the storage orientation;
d. means preventing gravity flow of flowable media between said holding chamber and said filling chamber whenever the container is in the pouring orientation;
e. means selectively discharging flowable media only from said holding chamber and the container whenever the said container is in the pouring orientation;
f. means preventing gravity flow of flowable media between said filling chamber and the source chamber whenever the container is in the storage orientation;
g. means preventing gravity flow of flowable media directly from the source chamber to said holding chamber whenever the container is in the pouring orientation;
h. means preventing gravity flow of the flowable media directly form the source chamber to the spout whenever the container is in the pouring orientation; and
i. an air vent disposed above said means providing gravity flow communication from the source chamber to said filling chamber whenever the container is in the pouring orientation; said air vent providing air flow communication between said filling chamber and the source chamber.

20. An insert, for positioning inside a container having a spout, a source chamber, and having pouring and storage orientations, said insert providing the formation of an arrangement for selectively discharging metered amounts of flowable media; said insert comprising:
a. a plurality of partition walls defining a filling chamber and a holding chamber connected in series;
b. said plurality of partition walls including means defining an entrance opening providing gravity flow communication from the source chamber to said filling chamber whenever the insert is operably positioned within a container and the container is positioned in the pouring orientation;
c. said plurality of partition walls defining said holding chamber and said filling chamber such that said filling chamber is disposed completely above said holding chamber whenever the insert is operably positioned within a container and the container is positioned in the storage orientation;
d. said plurality of partition walls including means defining a discharge opening that selectively discharges flowable media from said holding chamber and the container whenever the insert is operably positioned within a container and the container is positioned in the pouring orientation;
e. said plurality of partition walls including an intermediate panel between said filling chamber and said holding chamber, said intermediate panel preventing gravity flow communication of flowable media between said holding chamber and said filling chamber whenever said insert is operably positioned within a container and the container is positioned in the pouring orientation;
f. said intermediate panel defining an aperture providing gravity flow communication from said filling chamber to said holding chamber whenever said insert is operably positioned within a container and the container is positioned in the storage orientation, said intermediate panel being substantially flat and characterized by a lack of protrusions extending into said holding chamber and spaced from the container, whenever said insert is operably positioned within the container;
g. said plurality of partition walls including means preventing gravity flow of flowable media between said filling chamber and the source chamber whenever said insert is operably positioned within a container and the container is positioned in the storage orientation;
h. said plurality of partition walls including means preventing gravity flow of flowable media directly from the source chamber to said holding chamber whenever the insert is operably positioned within a container and the container is positioned in the poring orientation;. and
i. said plurality of partition walls including means preventing gravity flow of the flowable media directly from the source chamber to the spout whenever the insert is operably positioned within a container and the container is positioned in the pouring orientation.

21. An insert according to claim 20, wherein said insert comprises a substantially flat receptacle member and a substantially flat partition member, said receptacle member and said partition member are capable of being folded and mated to each other to form said insert.

* * * * *

UNITED STATES PATENT AND TRADEMARK OFFICE
CERTIFICATE OF CORRECTION

PATENT NO. : 5,135,138
DATED : August 4, 1992
INVENTOR(S) : Call

It is certified that error appears in the above-indentified patent and that said Letters Patent is hereby corrected as shown below:

Column 1, Line 4, "continuation-in-part" should read --Continuation-in-Part--.

Column 1, Line 4,5, "patent application" should read --Patent Application--.

Column 1, Line 6,7, "file wrapper continuation-in-part" should read --File Wrapper Continuation-in-Part--.

Column 1, Line 7, "patent application" should read --Patent Application--

Column 1, Line 26, 27, "principal" should read --principle--.

Column 3, Line 5, "drawing" should read --drawings--.

Column 6, Line 67, "224" should read --229--. (first occurrence)

Column 9, Line 27, insert --may-- after the numeral "370".

Column 16, Line 48, "storing" should read --storage--.

Column 17, Line 1, delete "said" after the word "the".

Column 17, Line 12, "form" should read --from--.

Signed and Sealed this

Fifth Day of March, 1996

Attest:

BRUCE LEHMAN

*Attesting Officer*     *Commissioner of Patents and Trademarks*